United States Patent [19]

Schlote

[11] Patent Number: 5,408,824

[45] Date of Patent: Apr. 25, 1995

[54] ROTARY HEAT ENGINE

[76] Inventor: Andrew Schlote, 2106 Pincian, Fenton, Mo. 63026

[21] Appl. No.: 167,243

[22] Filed: Dec. 15, 1993

[51] Int. Cl.[6] .............................................. F02C 3/14
[52] U.S. Cl. ...................................... 60/39.35; 416/21
[58] Field of Search ................... 60/39.34, 39.35, 271; 416/20 R, 21

[56] References Cited

U.S. PATENT DOCUMENTS

| | | |
|---|---|---|
| 1,003,708 | 9/1911 | Coleman . |
| 1,210,831 | 1/1917 | Pfeiffer . |
| 2,188,128 | 1/1940 | Armstrong . |
| 2,465,856 | 3/1949 | Emigh . |
| 2,474,685 | 6/1949 | McCollum . |
| 2,499,863 | 3/1950 | Hart . |
| 2,544,420 | 3/1951 | Goddard . |
| 2,603,947 | 7/1952 | Howard . |
| 2,637,166 | 5/1953 | Carswell . |
| 3,177,660 | 4/1965 | Haller . |

Primary Examiner—Timothy S. Thorpe
Attorney, Agent, or Firm—Senniger, Powrs, Leavitt & Reodel

[57] ABSTRACT

A jet-propelled rotary engine comprises a housing, a rotor journalled to the housing for rotation of the rotor about an axis, and at least one jet assembly secured to the rotor and adapted for combustion of a pressurized oxygen-fuel mixture. The jet assembly includes a hollow body having a closed leading end and an open trailing end downstream of the leading end. The hollow body defines a chamber having a combustion region where the pressurized oxygen-fuel mixture reacts during combustion to form combustion reaction products, a throat region downstream of the combustion region, a converging region extending from the combustion region to the throat region, and a diverging region extending from the throat region to the trailing end. The combustion reaction products form at least a part of thrust matter passing through the hollow body and discharged therefrom. The converging and diverging regions are configured for increasing the kinetic energy of and expanding the thrust matter. The trailing end defines a discharge port for high speed discharge of a jet stream of the thrust matter from the discharge port generally along a line tangent to the rotor periphery for turning the rotor. The converging region being of a shape such that a curve defined by the locus of centroids of transverse cross-sectional areas of the converging region slope radially outwardly relative to said tangent line.

10 Claims, 5 Drawing Sheets

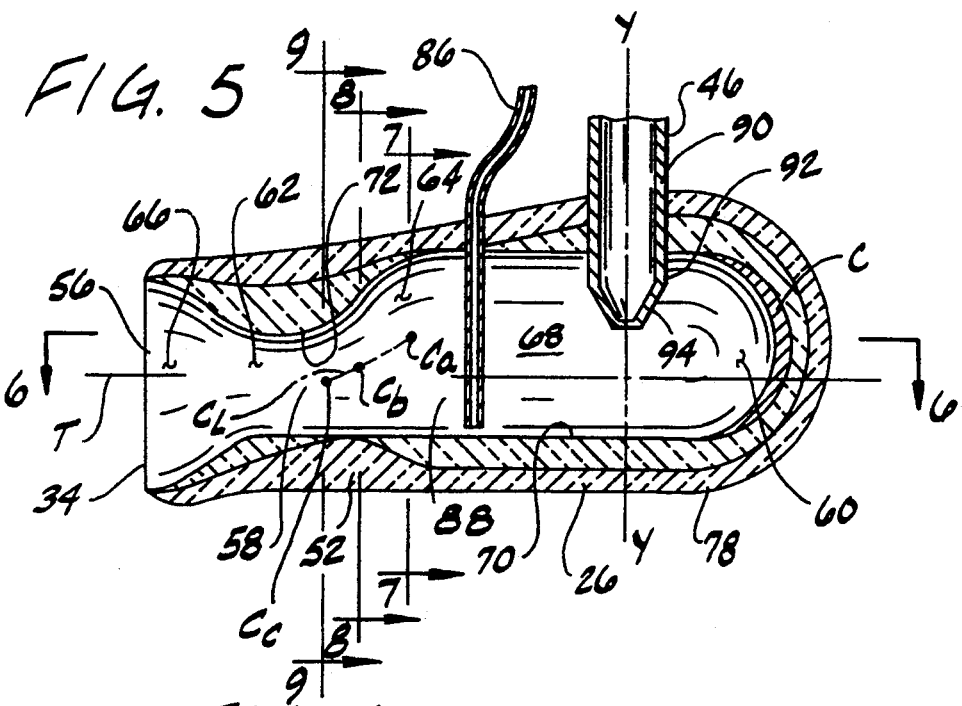

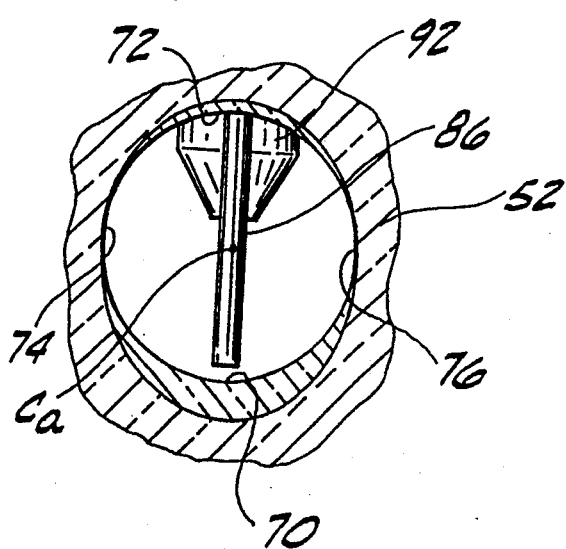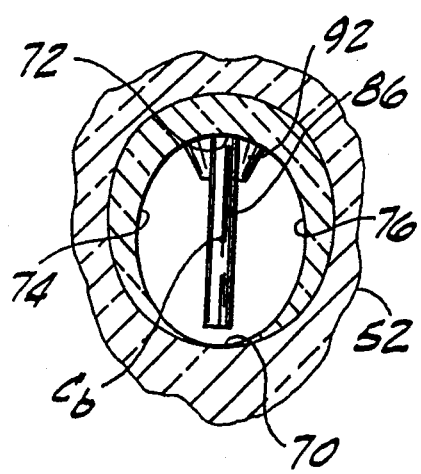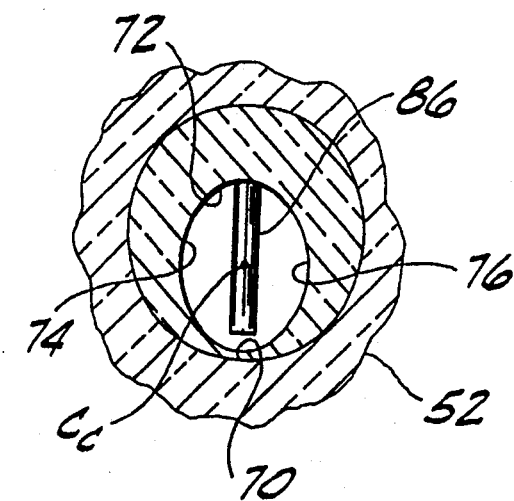

ROTARY HEAT ENGINE

BACKGROUND OF THE INVENTION

This invention relates generally to a rotary engine and, more particularly, to a jet-propelled rotary heat engine.

Producing motive power through the reactive force of jets has long been known. For instance, Goddard, U.S. Pat. No. 2,637,166 discloses a turbine in which the reactions of high velocity jets are used to effect rotation of a turbine; Howard, U.S. Pat No. 2,603,947 discloses a ram jet arrangement for rotation in a continuous combustion type generator; Goddard, U.S. Pat No. 2,544,420 discloses a combustion chamber used to provide rotational power in a propulsion apparatus such as in driving a propeller shaft; and Hart, U.S. Pat No. 2,499,863 discloses a rotary jet propelled motor.

However, jet-propelled rotary engines have not been incorporated in practical power plants or engines on a wide-scale basis because of the inefficiency of these prior art engines.

Thus, among the several objects and features of the present invention may be noted the provision of a jet-propelled rotary engine which may be operated more efficiently than prior art jet-propelled rotary engines; the provision of such a jet-propelled rotary engine having a jet assembly configured for increasing the kinetic energy of thrust matter (i.e., combustion reaction products and non-reaction matter, such as nitrogen, excess oxygen, water, etc) passing through and discharged from the jet assembly; the provision of such a jet-propelled rotary engine in which heat energy from the thrust matter is converted to kinetic energy; the provision of such a jet-propelled rotary engine in which drag on the rotor is reduced; the provision of such a jet-propelled rotary engine which minimizes failure of the engine; and the provision of such a jet-propelled rotary engine which uses lightweight materials to reduce the centrifugal force encountered at high rotational speeds.

Generally, a jet-propelled rotary engine of the present invention comprises a housing, a rotor journalled to the housing for rotation of the rotor about an axis, and at least one jet assembly secured to the periphery of the rotor and adapted for combustion of a pressurized oxygen-fuel mixture. The jet assembly includes a hollow body having a closed leading end and an open trailing end downstream of the leading end. The hollow body defines a chamber having a combustion region in which the pressurized oxygen-fuel mixture reacts during combustion to form combustion reaction products, a throat region downstream of the combustion region, a converging region extending from the combustion region to the throat region, and a diverging region extending from the throat region to the trailing end. The combustion reaction products form at least a part of thrust matter passing through the hollow body and discharged therefrom. The converging and diverging regions are configured for increasing the kinetic energy of and expanding the thrust matter. The trailing end defines a discharge port for high speed discharge of a jet stream of the thrust matter from the discharge port generally along a line tangent to the rotor periphery for turning the rotor. The converging region is shaped such that a curve defined by the locus of centroids of transverse cross-sectional areas of the converging region slopes radially outwardly relative to the tangent line.

The method of the present invention comprises the steps of introducing a pressurized oxygen-fuel mixture to the combustion region of the chamber, burning the oxygen-fuel mixture in the combustion region to form thrust matter, introducing water to the chamber for vaporization by the hot thrust matter, and increasing the kinetic energy of and expanding the thrust matter and vaporized water through the converging and diverging regions of the chamber.

Other objects and features will be in part apparent and in part pointed out hereinafter.

BRIEF DESCRIPTION OF THE DRAWINGS

FIG. 4 is an enlarged end view of one of the jet assemblies of FIG. 2;

FIG. 5 is a sectional view taken along the plane of line 5—5 of FIG. 4;

FIG. 6 is a sectional view taken along the plane of line 6—6 of FIG. 5;

FIG. 7 is a fragmented cross-sectional view taken along the plane of line 7—7 of FIG. 5;

FIG. 8 is a fragmented cross-sectional view taken along the plane of line 8—8 of FIG. 5; and FIG. 9 is a fragmented cross-sectional view taken along the plane of line 9—9 of FIG. 5.

Corresponding reference characters indicate corresponding parts throughout the several views of the drawings.

DETAILED DESCRIPTION OF A PREFERRED EMBODIMENT

Figure 1:
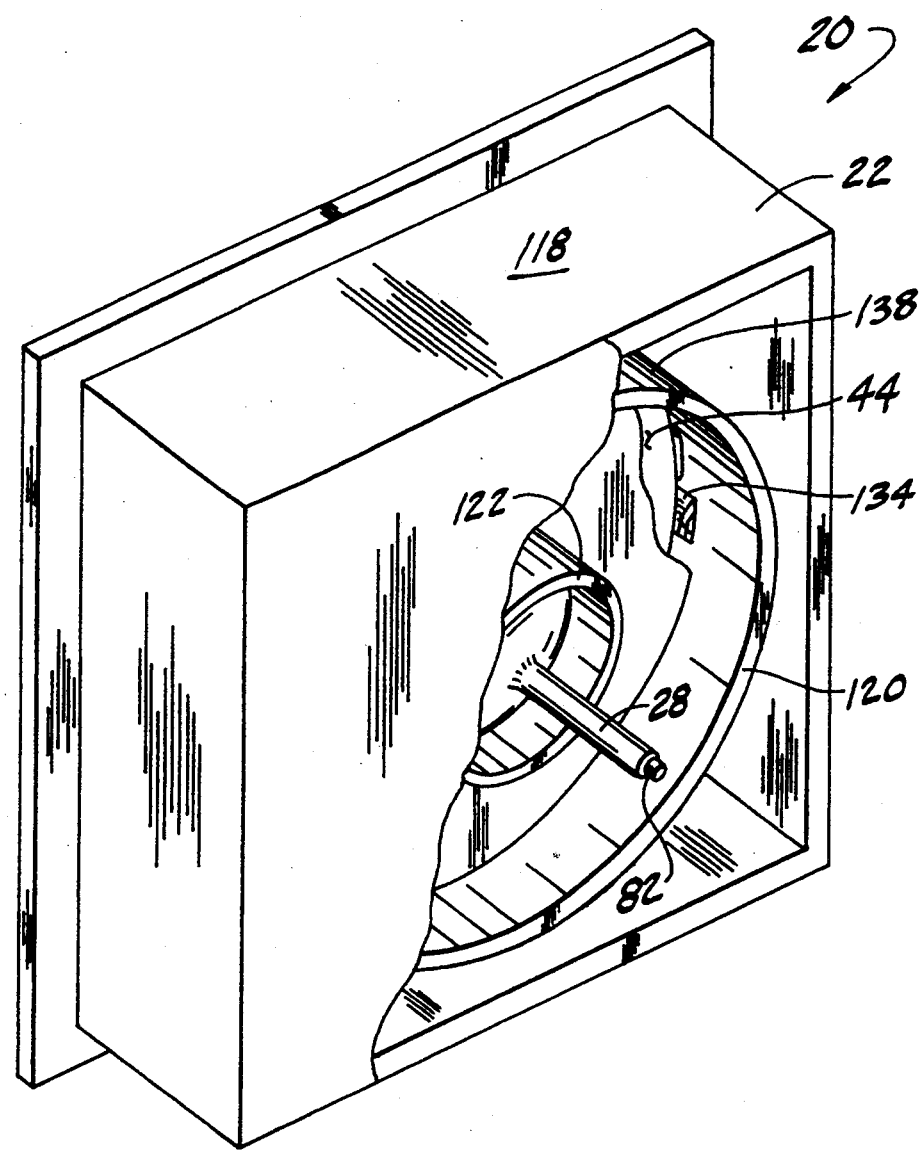
FIG. 1 is a perspective view of a jet-propelled rotary engine of the present invention with portions broken away to show detail.

Referring now to the drawings, a jet-propelled rotary engine of the present invention is indicated in its entirety by the reference numeral 20. The engine comprises a housing, generally designated 22, a rotor 24 journalled to the housing for rotation of the rotor about an axis X and a plurality of jet assemblies 26 secured to the periphery of the rotor and adapted for combustion of a pressurized oxygen-fuel mixture for imparting rotation to a power drive shaft 28 attached to the rotor. Preferably, the oxygen-fuel mixture comprises a mixture of air and a suitable fuel, such as methane or propane. As discussed in greater detail below, the rotor 24 and jet assemblies 26 rotate within an evacuable chamber 30 of the housing 22. Evacuation of the chamber 30 reduces drag on the rotor 24 and jet assemblies 26 and allows thrust gases to expand to a lower pressure, thereby resulting in more kinetic energy.

The engine 20 of the present invention produces power through the high-speed (preferably supersonic) discharge of a combusted fuel from the jet assemblies 26 which causes the rotor 24 and the attached power drive shaft 28 to rotate. As described in greater detail below, a pressurized oxygen-fuel mixture is combusted within each jet assembly 26 and discharged through a discharge port 34 for the supersonic discharge of the combustion reaction products. Mixed in with the reaction products is non-reaction matter, i.e., matter such as nitrogen, excess oxygen, water, etc., introduced into the jet assembly 26 but which is not part of the combustion reaction. The combustion reaction products and non-reaction matter (collectively, the "thrust matter") are discharged from the discharge port 34 of each jet assembly as a jet stream (not shown), preferably along a line tangent to the rotor periphery (i.e., along a line perpendicular to a line passing through the axis of rotation) to maximize the turning forces applied to the rotor 24.

Figure 2:
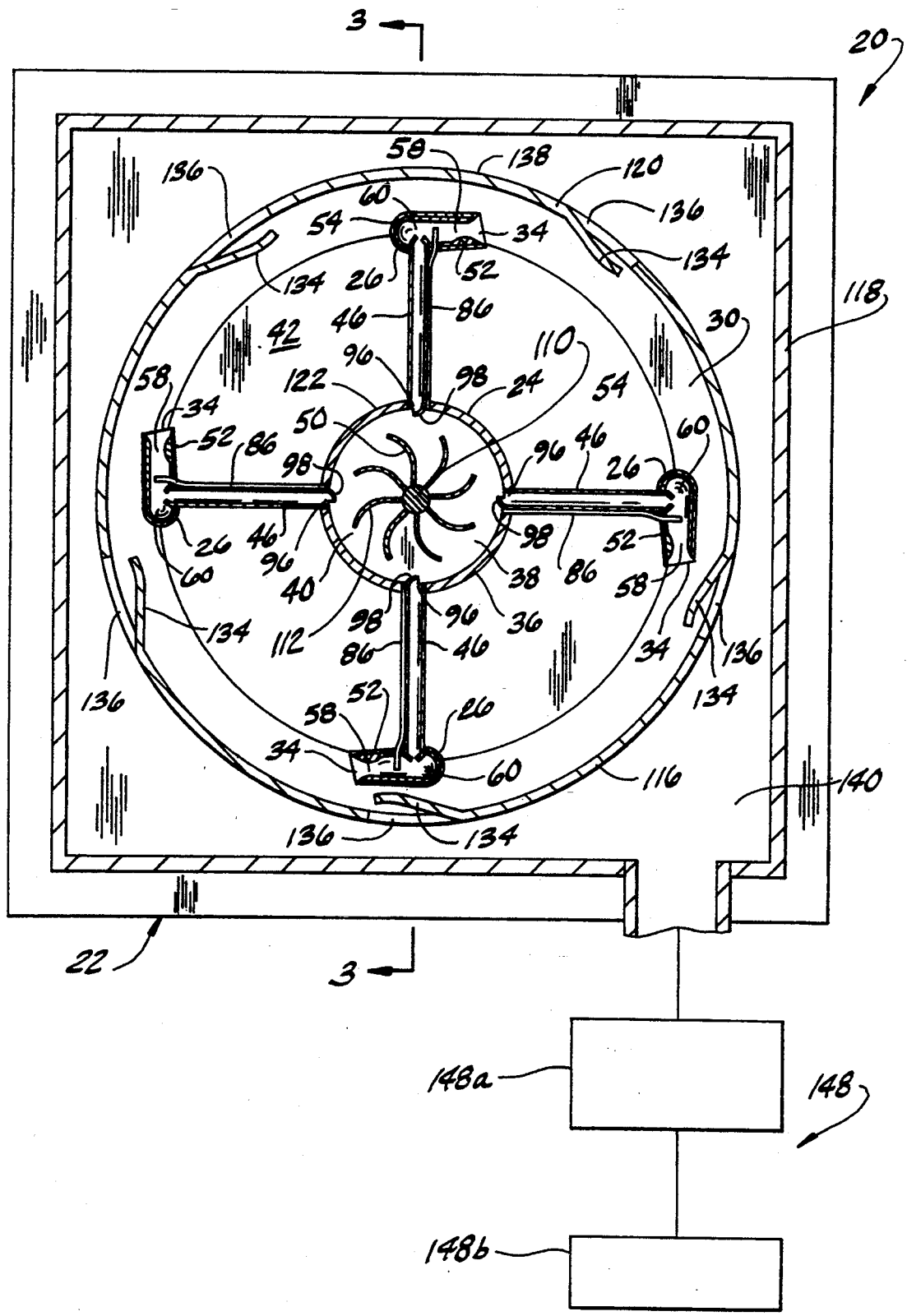
FIG. 2 is a front elevational view in section showing a rotor and jet assemblies of the jet-propelled rotary engine of FIG. 1.

The rotor 24 of the present invention comprises a rotor bell 36 defining a compression chamber 38 (FIG. 2) at the central portion 40 of the rotor, first and second disc-shaped plates 42, 44 extending radially from the rotor bell to the jet assemblies, and a plurality of fluid conduits 46 extending from the compressor chamber to the jet assemblies 26. A supply tube 48 (FIG. 2) is in fluid communication with the compression chamber 38 for delivering the oxygen-fuel mixture to the compression chamber. A compressor fan 50 located within the compression chamber 38 rotates to compress the oxygen-fuel mixture to force the mixture from the chamber into the conduits 46. The jet assemblies 26 are secured to the disc-shaped plates 42, 44 and conduits 46 of the rotor 24. The conduits 46 deliver the compressed (pressurized) oxygen-fuel mixture from the compression chamber 38 of the rotor 26 to each jet assembly 26 for combustion of the mixture within the jet assemblies. Preferably, the conduits 46 are sized so that rotation of the rotor 24 causes further compression of the oxygen-fuel mixture as the mixture moves radially outwardly through the conduits.

The combustion of the oxygen-fuel mixture in the jet assemblies 26 and supersonic discharge of the thrust matter imparts a reactive force on the rotor 24 to cause it to rotate. The drive shaft 28 is fixed to the rotor 24 and rotates therewith. The drive shaft 28 is journalled to the housing 22 and supports the rotor 24 within the housing. Discharge of the thrust matter thus causes rotation of the jet assemblies 26, rotor 24 and drive shaft 28 about axis X.

As shown in FIGS. 4–6, the jet assemblies 26 of the present invention combust the oxygen-fuel mixture and accelerate the thrust matter to the discharge port 34 of the jet assembly 26. Each jet assembly 26 includes a hollow body 52 having a closed leading end 54 and an open trailing end 56 downstream of the leading end. The closed leading end 54 of each jet assembly 26 is preferably tapered to reduce drag on the jet assemblies. The hollow body 52 of each jet assembly 26 defines a chamber 58 having a combustion region 60, a throat region 62 downstream of the combustion region, a converging region 64 extending from the combustion region to the throat region, and a diverging region 66 extending from the throat region to the trailing end 56. The interior surface 68 of the hollow body 52 is smooth to minimize unnecessary friction losses and turbulence and includes a distal surface portion 70 and a proximate surface portion 72. The distal surface portion 70 extends radially outward relative to the proximate surface portion 72. Opposing side surfaces 74, 76 connect the distal and proximate surface portions 70, 72.

The oxygen-fuel mixture is delivered by each conduit 46 to the combustion region 60 of the chamber 58 of each jet assembly 26. The pressurized oxygen-fuel mixture is ignited by a glow plug (not shown) or other suitable means and reacts in the combustion region 60 of the chamber 58 during combustion. The jet assembly 26 includes heat shields 78, preferably formed of ceramic materials adjacent the combustion region to reduce heat loss through the body 52 of each jet assembly 26. The combustion region 60 of the chamber 58 is shaped to direct the combustion reaction products and non-reaction matter toward the converging region 64 of the chamber.

A water feed system, generally indicated at 80 (FIG. 3) transports water to the jet assemblies 26. The feed system 80 comprises a fluid line 82 within the drive shaft 28, a manifold 84 within the compression chamber 38 connected to the fluid line, and four feed tubes 86 extending from the manifold generally parallel to the plurality of conduits 46 to the jet assemblies 26. The water feed system 80 constitutes means for delivering water to the chamber 58 of each jet assembly.

Prior to entering the converging region 64, the hot thrust matter is injected with water. The water is vaporized by the hot thrust matter to convert heat energy to kinetic energy. Water is delivered to each jet assembly 26 and injected into the combustion reaction products through the corresponding water feed tube 86 of the water feed system 80. The feed tube 86 extends into a water injection region 88 of the chamber 58 of each jet assembly 26. The feed tubes 86 spray water as the hot matter passes the tubes.

The configuration of each jet assembly 26 also increases the kinetic energy of the thrust matter. The converging region 64 of each jet assembly 26 is configured with the distal surface portion 70 generally parallel to the tangent line, indicated at T in FIGS. 4 and 5, and with the proximate surface portion 72 and side surfaces 74, 76 converging relative to one another from the combustion region 60 to the throat region 62. The slope of the proximate surface portion 72 is relatively steep with respect to the tangent line T. Because of the configuration of the converging region 64, the locus of centroids of cross-sectional areas of the converging region transverse to the tangent line T define a curve $C_1$ (shown in broken lines in FIG. 5) which slopes radially outwardly (from right to left as viewed in FIG. 5) relative to the tangent line. One such cross-sectional area, lying in the plane of line 7—7 of FIG. 5, has a centroid $C_a$ (FIG. 7). Another such cross-sectional area, lying in the plane of line 8—8 of FIG. 5, has a centroid $C_b$ (FIG. 8). Another such cross-sectional area, lying in the plane of line 9—9 of FIG. 5 has a centroid $C_c$ (FIG. 9).

With this configuration, the thrust matter expands in the supersonic nozzle without being impeded by the walls of the nozzle as it moves rearwardly (from right to left in FIG. 5) through the converging region. Since the distal surface portion 70 does not slope radially inwardly, the thrust matter does not have to move radially inwardly. In other words, the thrust matter does not have to move counter to the centrifugal forces acting on the matter.

The jet assembly 26 is further configured for expanding the thrust matter and for condensing water from the matter. The diverging region 66 of each jet assembly 26 is contoured so that the distal, proximate and side interior surfaces 70, 72, 74 diverge relative to one another from the throat region 62 to the trailing end 56. The diverging region 66 is shaped to accelerate the thrust matter to supersonic velocity. The diverging region 66 also causes some of the water vapor present in the hollow body 52 to condense. Preferably, the condensation of water occurs at the trailing end 56 of the hollow body 52 to prevent kinetic energy loss and possible collapse of the supersonic expansion in the diverging region 66.

The jet assemblies 26 are secured to the conduits 46 of the rotor 26 and each jet assembly is balanced about an axis indicated at Y extending longitudinally from the conduit to which it is connected. Balancing the jet assembly 26 about the conduit 46 minimizes the stresses encountered upon rapid rotation of the conduits. Counterweights C may need to be used to balance the jet assemblies 26. Each jet assembly 26 is constructed of heat resistant, lightweight materials such as aluminum oxide, silicon carbide, or any other suitable material, and covered for strength with a jacket (not shown) preferably made of stainless steel or beryllium.

The rotor 24 of the engine 20 preferably includes four conduits 46 in fluid communication with the compression chamber 38 of the rotor bell 36. Each conduit 46 extends generally radially outward from the rotor bell 36 to a corresponding jet assembly 26 for delivering the oxygen-fuel mixture compressed in the compression chamber 38 to each jet assembly. Preferably, the conduits 46 are formed of a strong, lightweight material such as a graphite composite. Each conduit 46 includes a discharge end 90 in communication with a jet assembly 26. The oxygen-fuel mixture flows from the rotor bell 36 through the conduit 46 to the discharge end 90 due to the centrifugal forces propelling the mixture outwardly upon rotation of the rotor 24.

The discharge end 90 of each conduit 46 includes a delivery nozzle 92 which extends into the combustion region 60 of the jet assembly 26. The oxygen-fuel mixture is preferably well below combustion temperature near the rotor bell 36. This permits the rotor bell 36 and at least a substantial portion of the conduits 46 to operate below combustion temperatures. Lower operating temperatures reduce the risk of temperature related failure of the rotor bell 36 and conduits 46. The discharge end 90 of each conduit 46 includes a nozzle restriction 94. The nozzle restriction 94 is adapted to dispense the oxygen-fuel mixture at such a velocity that the possibility of back flashing of the oxygen-fuel mixture upon combustion is highly unlikely. The nozzle restriction 94 causes an increase in velocity of the oxygen-fuel mixture within the conduit 46 to prevent back flashing in the conduits. Each conduit 46 is preferably of sufficient cross-sectional area so that centrifugal forces of the rotating rotor cause further compression of the pressurized oxygen-fuel mixture as the mixture moves radially outward in the conduit from the compression chamber 38 of the rotor bell 36 to the jet assembly 26. The oxygen-fuel mixture is decelerated in the combustion region 60 of the jet assembly at the discharge end 90 of the conduit 46 thereby causing a further increase in pressure of the mixture. Due to the placement of the end portion of the delivery nozzle 92 within the combustion region 60 of each jet assembly 26, the nozzle is heated by the combustion reaction products. The oxygen-fuel mixture is heated in the conduit 46 by compression of the mixture and further heated in the nozzle 92 to cause hydroxylation of the fuel prior to its entry into the combustion region 60. Hydroxylation of the fuel results in a more efficient combustion and thus increases the efficiency of the engine 20.

Each conduit 46 has an intake port 96 in fluid communication with the rotor bell 36. The oxygen-fuel mixture in the compression chamber 38 is forced into each conduit 46 by the increased pressure due to the compressor fan 50 increasing the pressure of the mixture and stagnation pressure from deceleration of the fluids. A vane 98 at the intake port 96 of each conduit 46 guides the mixture into the conduit. The vane 98 reduces the speed of the oxygen-fuel mixture at the point of entry into each conduit 46 to further increase the pressure of the mixture and force the oxygen-fuel mixture into each conduit.

Although the preferred engine 20 comprises four jet assemblies 26, it is to be understood that any number of jet assemblies may be used and still be within the scope of the present invention. It will be noted that a rotary engine of the present invention is operable with one conduit in communication with one jet assembly 26. If only one jet assembly is employed, it is necessary to counter-balance the single jet assembly in order to avoid excess rotational vibration.

Figure 3:
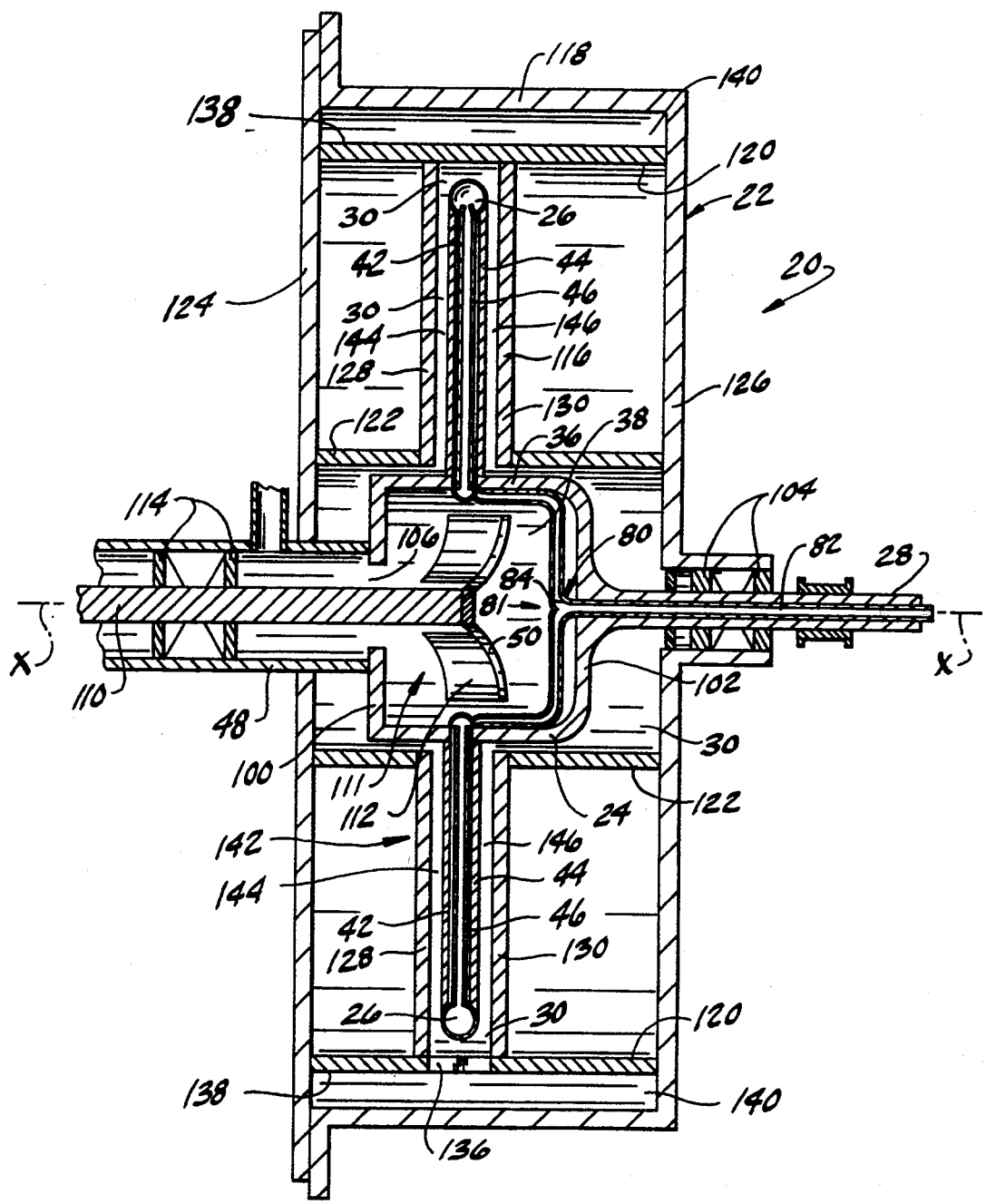
FIG. 3 is a sectional view taken along the plane of line 3—3 of FIG. 2.

As shown in FIG. 3, the rotor bell 36 is cylindric in shape and has an open end 100 and a closed end 102. The drive shaft 28 extends axially from the closed end 102. Preferably, the drive shaft 28 is integrally formed with or securely fastened to the rotor bell 36 for rotation therewith. The drive shaft 28 is journalled to the housing 22 through bearings 104 and supports the rotor 24 within the housing. The fluid line 82 of the water feed system 80 is housed within the hollow drive shaft 28.

The open end 100 of the rotor bell 36 includes a oxygen-fuel intake port 106. The stationary oxygen-fuel supply tube 48 extends into the housing 22 and is in communication with the intake port 106 for supplying fuel to the compression chamber 38. The supply tube 48 is connected to the rotor bell 36 through a high-speed rotational seal (not shown) to sealingly connect the supply tube to the compression chamber. The oxygen-fuel mixture is thus transferred through the oxygen-fuel supply line 48 past the intake port 106 of the rotor bell 36 and into the compression chamber 38 of the rotor bell for compression by the rotor compressor fan 50.

The compressor fan 50 of the rotor 26 is mounted to a shaft 110 in the compression chamber 38. The fan 50 and shaft 110 comprise a motor-driven air compressor 111 of the engine 20. The compressor fan 50 has a plurality of blades 112 for mixing the oxygen-fuel mixture upon rotation and for increasing the pressure within the compression chamber 38. In the preferred embodiment, the fan 50 is equipped with rearwardly inclined blades 112 to provide increased pressure in the compressor chamber 38. Alternatively, straight or forwardly inclined turbine blades may be used. The shaft 110 extends from the rotor bell 36 through the intake port 106 of the rotor bell and is sealingly journalled within the oxygen-fuel supply tube 48 through a pair of bearings 114, as shown in FIG. 3. The oxygen-fuel supply tube 48 surrounds the compressor shaft 110 and is concentric therewith. The shaft 110 extends through the supply tube 48 and is driven by an independent compressor control motor (not shown). The compressor control motor permits adjustment to the compression ratio of the compressor fan 50 for controlling the speed of the rotor 24 during changing conditions, i.e. start-up, shutdown, and sudden changes in load.

As shown in FIG. 1, the housing 22 encloses the rotor 24, the jet assemblies 26, and a portion of the power drive shaft 28 which extends from the housing to supply the output from the engine 20. The housing 22 includes a rotor housing 116 and an exterior casing 118 surrounding the rotor housing. The rotor housing 116 comprises concentric outer and inner annular walls 120, 122 which extend between opposite sides 124, 126 of the exterior casing 118, and first and second parallel plates 128, 130 extending between the annular walls. The first and second plates 128, 130 are axially spaced apart and, in conjunction with the outer and inner annular walls 120, 122 define a chamber 30 which accommodates the rotor 24 and jet assemblies 26. The outer annular wall 120 of the rotor housing 116 is formed with several exhaust ports 136 and a corresponding number of inwardly opening deflectors 134 adjacent the exhaust ports. The outwardly facing surface 138 of the outer annular wall 120 and the exterior casing 118 are circumferentially spaced apart to define an exhaust duct 140 for the removal of condensed water vapor and other discharge products from the internal chamber 30 through the exhaust ports 136 of the outer annular wall.

The housing 22 includes means, indicated generally at 142, for evacuating the internal chamber 30 of the rotor housing 116 for reducing drag on the rotor 24. The first and second axially spaced disc-shaped rotor plates 42, 44 are mounted to opposite sides of the conduits 46 and extend from the rotor bell 36 to the jet assemblies 26. The first rotor plate 42 is axially spaced from and opposes the first stationary plate 128 of the rotor housing 116 to define a first clearance gap 144. The second rotor plate 44 is mounted on the opposite side of the conduits 46 and is axially spaced from and opposes the second stationary plate 130 of the rotor housing 116 to define a second clearance gap 146. The first and second clearance gaps 144, 146 are sufficiently wide to prevent the rotor 24 from contacting the first and second stationary plates 128, 130 during rotation of the rotor 24 relative to the housing 22 and sufficiently narrow to reduce counterflow drafts between the rotor plates 42, 44 and stationary plates during rotation of the rotor relative to the housing. Due to the rapidly spinning rotor 24 and the closely spaced stationary plates 128, 130, the air trapped between the rotor plates 42, 44 and the stationary plates tends to accelerate toward the rotor periphery where the air can escape through the exhaust ports 136 of the rotor housing 116, thereby to reduce pressure in the rotor housing. The rotor plates 42, 44 and the stationary plates 128, 130 of the rotor housing 116 thus constitute means 142 for evacuating the chamber 30.

The evacuation means further comprises means for removing the reaction products and condensed water discharged from the jet assemblies 26 for reducing drag on the rotor 24 and jet assemblies. The discharged reaction products and condensed water are forced toward the outer annular wall 120 of the rotor housing 116 due to the centrifugal force present at the discharge port 34 of the jet assembly 26. The inwardly opening deflectors 134 of the outer annular wall 120 direct the reaction products and condensed water through the exhaust ports 136 of the outer annular wall and into the circumferential duct 140 disposed radially outwardly of the rotor housing 146. The housing 22 is further provided with an exhaust pump shown schematically at 148 to reduce pressure in the housing for removing the reaction products and the condensed water from the circumferential exhaust duct 140. The exhaust pump 148 comprises a condenser 148a for condensing water vapor from the housing a vacuum pump 148b for removing gas and condensed water. The deflectors 134, exhaust ports 136, circumferential duct 140 and vacuum pump 148a constitute means for removing the reaction products, condensed water and other non-reaction matter discharged from the jet assemblies.

The method of operating the above-described jet-propelled rotary engine includes introducing a pressurized oxygen-fuel mixture into the combustion region 60 of the chamber 58 of each jet assembly 26. The oxygen-fuel mixture is transported to the compression chamber 58 of the rotor 24 and compressed by the compressor 111. The compressed mixture then moves radially outward through the rotor conduits 46 to the combustion region 60 of the respective jet assemblies 26 and is further compressed within the conduits due to the rotation of the mixture in the conduits. The temperature of the oxygen-fuel mixture increases as the mixture moves radially outward through the conduits 46 and is further heated in the nozzle 92 of the conduits to hydroxylate the fuel prior to its entry into the combustion region 60 of the chamber 58. The oxygen-fuel mixture is then delivered into the combustion region 60 of each jet assembly 26 through the nozzle restriction 94 which prevents ignition of the fuel prior to entry into the combustion region.

The hydroxylated fuel is burned in the combustion region 60 to form hot thrust matter. The thrust matter is directed towards the throat 62 of the jet assembly 26 and water is introduced into the chamber 58. The water is vaporized by the hot thrust matter and becomes part of the thrust matter, thereby increasing the kinetic energy of the thrust matter.

The operating conditions of the engine 20 is preferably selected so that the pressure and temperature of the thrust matter as it exits the discharge port 34 approximates the pressure and temperature of saturated water vapor. This may be accomplished by controlling the compression ratio of the compressor 111 to maintain an appropriate rate of flow of oxygen-fuel mixture to the combustion region 60, and by controlling the water feed system 80 to maintain an appropriate delivery rate of water to the chamber 58. The thrust matter exits through the discharge port 34 of each jet assembly 26 into the rotor housing 116. The rotor housing 116 is continually evacuated to remove the thrust matter to reduce drag on the rotor 24.

Thus it may be seen that the several objects and features of the present invention are achieved in the jet-propelled rotary engine 20 disclosed herein. The injection of water into the thrust matter and the evacuation of the rotor housing 116 enables the engine 20 to operate efficiently and permits the engine to expand the thrust matter with no superheat present in the discharge stream. Further, the jet assembly 26 configuration compensates for the effect of centrifugal force upon the thrust matter and permits the efficient expansion of the thrust matter. The efficiency of the engine 20 is further improved by hydroxylation of the fuel prior to combustion which breaks down long-carbon fuels.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A jet-propelled rotary engine comprising:
a housing;

a rotor journalled to said housing for rotation of the rotor about an axis, said rotor having a rotor periphery; and at least one jet assembly secured to the rotor periphery and adapted for combustion of a pressurized oxygen-fuel mixture, said jet assembly including a hollow body having a closed leading end and an open trailing end downstream of the leading end, said hollow body defining a chamber having a combustion region in which the pressurized oxygen-fuel mixture reacts during combustion to form combustion reaction products, a throat region downstream of the combustion region, a converging region extending from the combustion region to the throat region, and a diverging region extending from the throat region to the trailing end, said combustion reaction products forming at least a part of thrust matter passing through the hollow body and discharged therefrom, said converging and diverging regions configured for increasing the kinetic energy of and expanding the thrust matter, said trailing end defining a discharge port for high speed discharge of a jet stream of the thrust matter from the discharge port generally along a line tangent to the rotor periphery for turning the rotor, said converging region being of a shape such that a curve defined by the locus of centroids of cross-sectional areas of the converging region transverse to said tangent line slopes radially outwardly relative to said tangent line.

2. A jet-propelled rotary engine as set forth in claim 1 wherein said rotor comprises at least one conduit extending generally radially outwardly from a central portion of said rotor to said jet assembly for delivering an oxygen-fuel mixture to said jet assembly, said conduit having a discharge end in communication with the combustion region of the chamber.

3. A jet-propelled rotary engine as set forth in claim 2 further comprising a delivery nozzle at the discharge end of said conduit, said nozzle having a nozzle restriction for preventing ignition of the oxygen-fuel mixture within the conduit and nozzle, said nozzle extending into the combustion region where it is heated by the combustion reaction products and heats the fuel of the oxygen-fuel mixture in the conduits thereby to hydroxylate the fuel before it is discharged into the combustion regions of the chambers.

4. A jet-propelled rotary engine as set forth in claim 2 further comprising a compressor communicating with said conduit for compressing the oxygen-fuel mixture.

5. A jet-propelled rotary engine as set forth in claim 1 wherein said rotor comprises at least one fluid passage communicating with the chamber of said jet assembly for delivering water into the chamber of said jet assembly.

6. A jet-propelled rotary engine as set forth in claim 1 wherein said housing comprises a rotor housing enclosing the rotor and jet assembly.

7. A jet-propelled rotary engine as set forth in claim 6 further comprising means for evacuating the rotor housing for reducing drag on the rotor.

8. A jet-propelled rotary engine as set forth in claim 7 wherein said rotor further comprises first and second axially spaced parallel planar surfaces, and wherein said rotor housing further comprises a first plate axially spaced from and opposing the first planar surface of said rotor and a second plate axially spaced from and opposing the second planar surface of said rotor, said first planar surface and said first plate defining a first clearance gap and said second planar surface and said second plate defining a second clearance gap, said clearance gaps being sufficiently wide to prevent the rotor from contacting the first and second plates during rotation of the rotor relative to the housing and sufficiently narrow to reduce counterflow drafts between the planar surfaces and plates during rotation of the rotor relative to the housing, said planar surfaces and said plates constituting said evacuating means.

9. A jet-propelled rotary engine as set forth in claim 8 wherein said evacuating means further comprises means for removing at least some of the thrust matter discharged from said jet assemblies.

10. A jet-propelled rotary engine as set forth in claim 9 wherein said rotor housing further comprises a circumferential duct disposed radially outwardly of said jet assembly, said duct comprising a plurality of openings for passage of the thrust matter discharged from said jet assembly.

* * * * *